(12) United States Patent
Ogura et al.

(10) Patent No.: US 11,722,608 B2
(45) Date of Patent: *Aug. 8, 2023

(54) MAINTENANCE SUPPORT DEVICE, MAINTENANCE SUPPORT METHOD, AND NON-TRANSITORY COMPUTER READABLE MEDIUM

(71) Applicant: TOSHIBA TEC KABUSHIKI KAISHA, Tokyo (JP)

(72) Inventors: Kazuhiro Ogura, Hiratsuka Kanagawa (JP); Hiroyo Tanaka, Koto Tokyo (JP); Masaki Narahashi, Shinagawa Tokyo (JP); Sou Miyazaki, Sunto Shizuoka (JP); Satoshi Oyama, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,814

(22) Filed: Oct. 28, 2021

(65) Prior Publication Data

US 2022/0053101 A1 Feb. 17, 2022

Related U.S. Application Data

(63) Continuation of application No. 17/014,629, filed on Sep. 8, 2020, now Pat. No. 11,196,879.

(30) Foreign Application Priority Data

Sep. 10, 2019 (JP) .................. 2019-164499

(51) Int. Cl.
*H04N 1/00* (2006.01)
*H04N 1/32* (2006.01)

(52) U.S. Cl.
CPC ..... *H04N 1/00344* (2013.01); *H04N 1/00079* (2013.01); *H04N 1/0097* (2013.01);
(Continued)

(58) Field of Classification Search
CPC ............ H04N 1/00344; H04N 1/0097; H04N 1/32694; H04N 1/00244; H04N 1/00079;
(Continued)

(56) References Cited

U.S. PATENT DOCUMENTS 7,050,941 B2 5/2006 Wada
10,270,924 B2 4/2019 Sato
(Continued)

FOREIGN PATENT DOCUMENTS

JP 2008-310582 A 12/2008
JP 2009-042960 A 2/2009
JP 2017-167620 A 9/2017

*Primary Examiner* — Neil R McLean
(74) *Attorney, Agent, or Firm* — Kim & Stewart LLP

(57) ABSTRACT

A maintenance support device includes a memory that stores data of a maintenance manual that describes a first maintenance work to be performed to resolve a failure of an image processing apparatus, and a processor configured to acquire, and store in the memory, work result information corresponding to a second maintenance work that has been performed to resolve the failure of the image processing apparatus, and generate additional information based on the acquired work result information and store in the memory the additional information in association with the data of the maintenance manual.

18 Claims, 9 Drawing Sheets

(52) U.S. Cl.
CPC ..... *H04N 1/00244* (2013.01); *H04N 1/00408* (2013.01); *H04N 1/00477* (2013.01); *H04N 1/32694* (2013.01); *H04N 2201/0094* (2013.01)

(58) Field of Classification Search
CPC ........... H04N 1/00477; H04N 1/00408; H04N 2201/0094
USPC ....................................................... 358/1.14
See application file for complete search history.

(56) References Cited

U.S. PATENT DOCUMENTS

| | | | |
|---|---|---|---|
| 2006/0078859 A1* | 4/2006 | Mullin | H04N 1/00042 434/219 |
| 2013/0201507 A1 | 8/2013 | Kamisuwa et al. | |
| 2020/0076960 A1 | 3/2020 | Yoshida et al. | |

* cited by examiner

FIG. 5

- 600 (frame)
- 602 WORK REPORT: REP-0003
- 601 DEVICE ID: MFP05
- 603 NAME OF CALL CENTER WORKER: TANAKA
- 604 DATE OF CALL: 2019/3/6
- 605 ERROR INFORMATION
  - FAILURE: DEFECTIVE IMAGE ▶ 606
  - ERROR CODE: ERR0123
  - USER EXPLANATION: CHANGES IN COLOR AT TIME OF COLOR PRINTING 607
- 610 ✓ SOLVED
- 609 DATE OF WORK: 2019/3/7
- 608 MAINTENANCE WORKER: SUZUKI
- 611 SOLUTION: USER EXPLANATION ▶
- SOLUTION DETAILS:

| | 612 LARGE CATEGORY | 613 MIDDLE CATEGORY | 614 SMALL CATEGORY | 615 |
  |---|---|---|---|---|
  | 1 | MANUAL ▶ | USER MANUAL ▶ | 10-37 ▶ | REFERENCE |
  | 2 | MANUAL ▶ | SERVICE MANUAL ▶ | 36-29 ▶ | REFERENCE |
  | 3 | SERVICE MATERIALS ▶ | SV0342 | | REFERENCE |

FIG. 7

| WORK REPORT | DATE OF WORK | NAME | DEVICE ID | DEVICE TYPE | FAILURE | ERROR CODE | SOLVED | SOLUTION | LARGE CATEGORY | MIDDLE CATEGORY | SMALL CATEGORY |
|---|---|---|---|---|---|---|---|---|---|---|---|
| REP-0003 | 20190307 | SUZUKI | MFP05 | A | DEFECTIVE IMAGE | ERR0123 | Yes | USER EXPLANATION | MANUAL | USER MANUAL | 10-37 |
| | | | | | | | | | MANUAL | SERVICE MANUAL | 36-29 |
| REP-0004 | 20190308 | SUZUKI | MFP03 | B | DISPLAY OF ERROR | ERR0213 | Yes | PART REPLACEMENT | SERVICE MATERIALS | SV0342 | |
| | | | | | | | | | MANUAL | SERVICE MANUAL | 45-25 |
| | | | | | | | | | NO MATERIALS | PARTS | part No.9876 |
| REP-0005 | 20190311 | SUZUKI | MFP03 | B | DISPLAY OF ERROR | ERR0213 | Yes | PART REPLACEMENT | SERVICE SNS | MesID:12345678 | |

# MAINTENANCE SUPPORT DEVICE, MAINTENANCE SUPPORT METHOD, AND NON-TRANSITORY COMPUTER READABLE MEDIUM

CROSS-REFERENCE TO RELATED APPLICATION

This application is a continuation of U.S. patent application Ser. No. 17/014,629, filed Sep. 8, 2020, which is based upon and claims the benefit of priority from Japanese Patent Application No. 2019-164499, filed Sep. 10, 2019, the entire contents of which are incorporated herein by reference.

FIELD

Embodiments described herein relate generally to a maintenance support device, a maintenance support method, and a non-transitory computer readable medium.

BACKGROUND

When an error occurs in an image forming apparatus such as an MFP (Multifunction Printer), image formation may be interrupted and a business operation may be stopped. To prevent such an error, a maintenance worker may routinely check the condition of the image forming apparatus on a regular schedule and do maintenance work as necessary.

However, whether a potential error can be prevented depends in part on the skill level of the maintenance worker performing the maintenance check. For this reason, online support systems have been developed to allow relatively unskilled maintenance workers to acquire necessary information and do appropriate maintenance work depending on the condition of an image forming apparatus even without extensive experience and/or high aptitude. Such support information is prepared based on a maintenance record that have been reported by a skilled maintenance worker.

In such online support systems, an operator needs to review maintenance reports reported by maintenance workers and determine which of the reports that are useful and should be by unskilled maintenance workers as a reference. However, since there are many maintenance reports reported by skilled and unskilled maintenance workers, it can be difficult for the operator to identify an appropriate maintenance record in a timely manner.

BRIEF DESCRIPTION OF THE DRAWINGS

FIG. 5 and FIG. 6 are diagrams of display screens each showing work result information.

FIG. 7 is a diagram showing a work information table according to an embodiment.

DETAILED DESCRIPTION

In general, according to one embodiment, a maintenance support device, a maintenance support method, and a method for providing guidance information for performing maintenance work are provided.

According to one embodiment, a maintenance support device includes a memory that stores data of a maintenance manual that describes a first maintenance work to be performed to resolve a failure of an image processing apparatus, and a processor. The processor is configured to acquire, and store in the memory, work result information corresponding to a second maintenance work that has been performed to resolve the failure of the image processing apparatus, and generate additional information based on the acquired work result information and store in the memory the additional information in association with the data of the maintenance manual.

Hereinafter, a maintenance support device, a maintenance support method, and a method according to an embodiment will be described with reference to the drawings.

Figure 1:
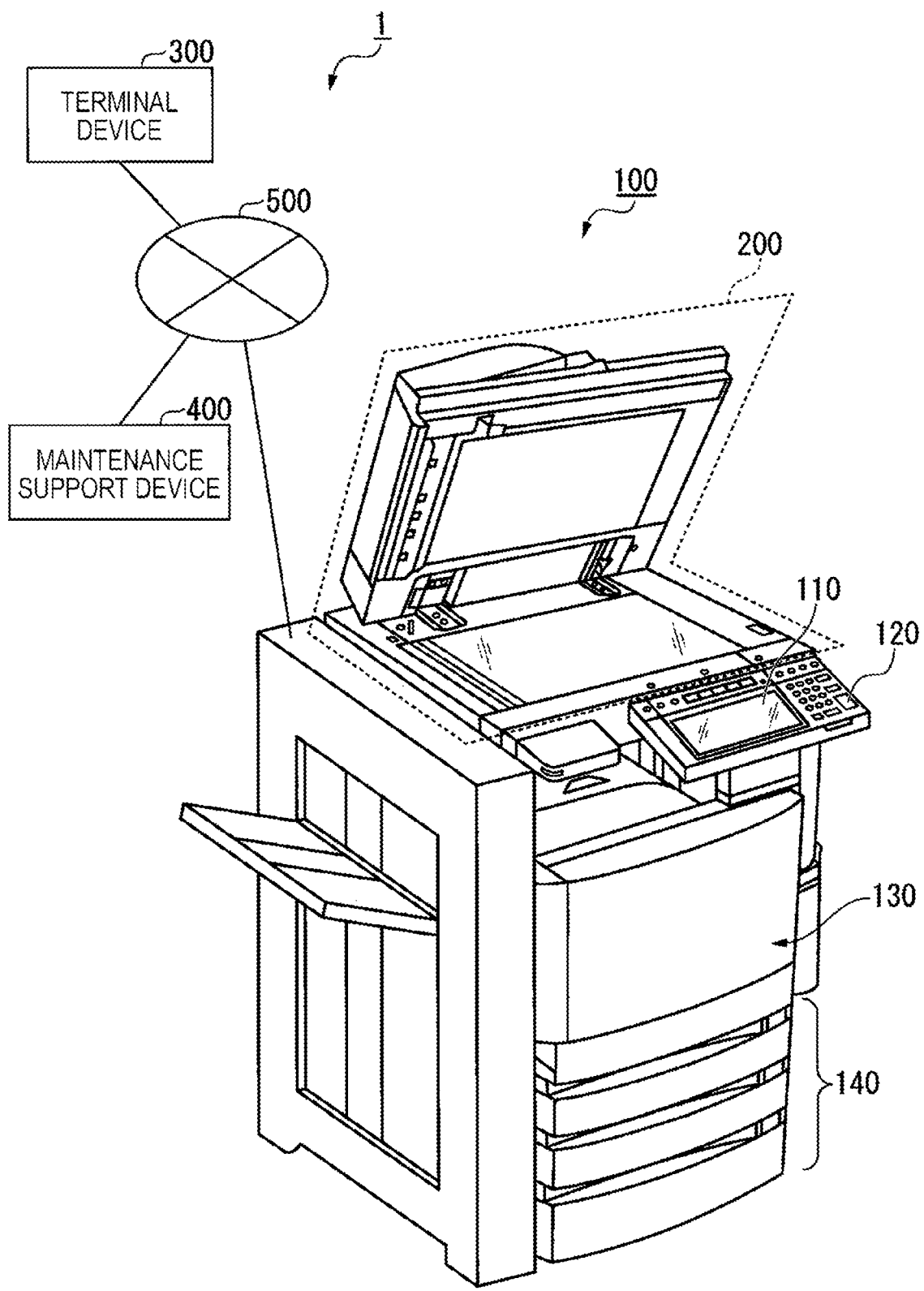
FIG. 1 is a diagram showing a configuration of a maintenance system according to an embodiment.

FIG. 1 is a diagram showing a configuration of a maintenance system 1 according to an embodiment. The maintenance system 1 includes an image forming device 100, a terminal device 300, and a maintenance support device 400. The image forming device 100 forms an image on a sheet using consumables such as toner and ink. The image forming device 100 is, for example, an MFP. The terminal device 300 generates information indicating results of maintenance work that has been performed by a maintenance worker on the image forming device 100. The maintenance support device 400 collects the information generated on the terminal device 300 indicating the results of maintenance work performed on an image forming device 100. The image forming device 100, the terminal device 300, and the maintenance support device 400 are communicatively connected to each other through a network 500.

Figure 2:
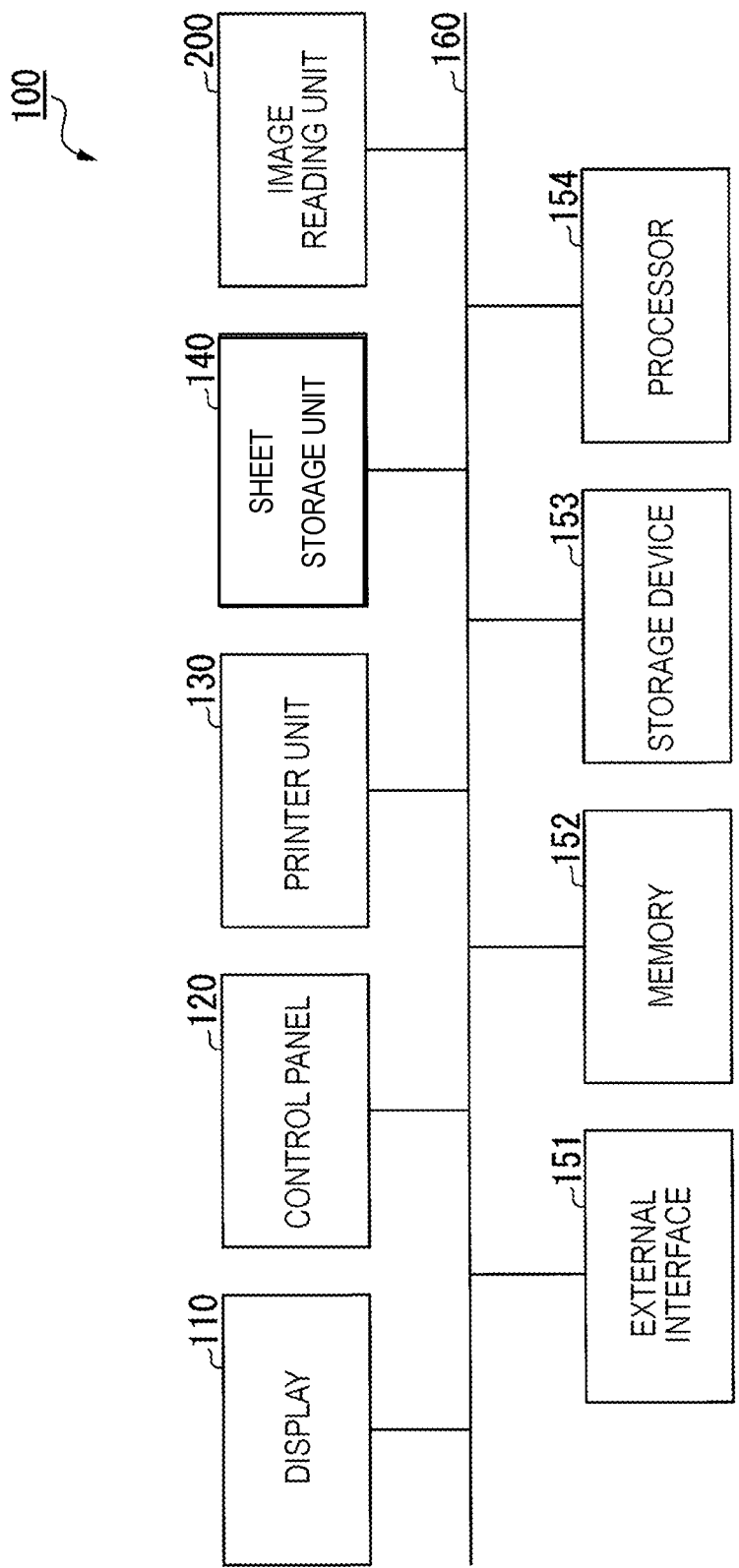
FIG. 2 is a hardware block diagram of an image forming device according to an embodiment.

FIG. 2 is a hardware block diagram of the image forming device 100 according to an embodiment. First, the image forming device 100 will be described using FIGS. 1 and 2. The image forming device 100 includes a display 110, a control panel 120, a printer unit 130, a sheet storage unit 140, an external interface 151, a memory 152, a storage device 153, a processor 154, and an image reading unit 200. The printer unit 130 of the image forming device 100 may be a device that fixes a toner image on a sheet or may be an ink jet type device. The units of the image forming device 100 are connected to each other through a system bus 160.

The image forming device 100 forms an image on a sheet using a developer such as a toner or ink. When the developer is a toner, the developer is attached to a sheet and heated to be fixed onto the sheet. When the developer is ink, the developer is dispensed onto a sheet. The sheet is, for example, paper or label paper. Any type of sheet may be used as long as the image forming device 100 can form an image on the surface thereof. Examples of the toner include a decolorable toner, a non-decolorable toner, a decorative toner, and the like.

The display 110 is an image display device such as a liquid crystal display (LCD) or an organic electro luminescence (EL) display. The display 110 displays various information regarding the image forming device 100.

The control panel 20 includes a plurality of buttons. The control panel 120 receives a user's input operation. The control panel 120 outputs a signal corresponding to an operation input by a user to the processor of the image forming device 100. The display 110 and the control panel 120 may be integrated into a touch-enabled display.

The printer unit 130 forms an image on a sheet on the basis of image information generated by the image reading unit 200 or image information received through a network connection. For example, the printer unit 130 forms an image through the following process. An image formation unit of the printer unit 130 forms an electrostatic latent image on a photoreceptor drum on the basis of image information. The image formation unit of the printer unit 130 forms a visible image by attaching a developer to the electrostatic latent image. A transfer unit of the printer unit 130 transfers the visible image onto a sheet. A fixing unit of the printer unit 130 fixes the visible image onto the sheet by heating and pressing the sheet. The sheet on which an image is formed may be initially stored in the sheet storage unit 140 or manually inserted by a user.

The sheet storage unit 140 stores sheets to be used for image formation in the printer unit 130.

The external interface 151 is a communication interface configured to communicate with another device (for example, the terminal device 300 or the maintenance support device 400) through the network 500 with a particular protocol.

The memory 152 temporarily stores data used by each unit of the image forming device 100. The memory 152 is, for example, a random access memory (RAM). The memory 152 stores data required for operation of the image forming device 100. The memory 152 may temporarily store digital data generated by the image reading unit 200. The memory 152 may temporarily store data of an image formed by the image forming device 100.

The storage device 153 is a storage device such as a magnetic hard disk device (HDD) or a semiconductor storage device (SSD). The storage device 153 stores data required for operation of the image forming device 100. The storage device 153 stores, for example, an error code indicating a failure occurred in the image forming device 100.

The processor 154 controls the units of the image forming device 100. The processor 154 executes a process by loading a software program stored in the storage device 153 into the memory 152 and executing the loaded software program.

The image reading unit 200 reads information about an image formed on a sheet as bright and dark signals. The image reading unit 200 records the read image information. The recorded image information may be transmitted to another information processing device through a network. The recorded image information may be used to form an image on a sheet by the printer unit 130.

Figure 3:
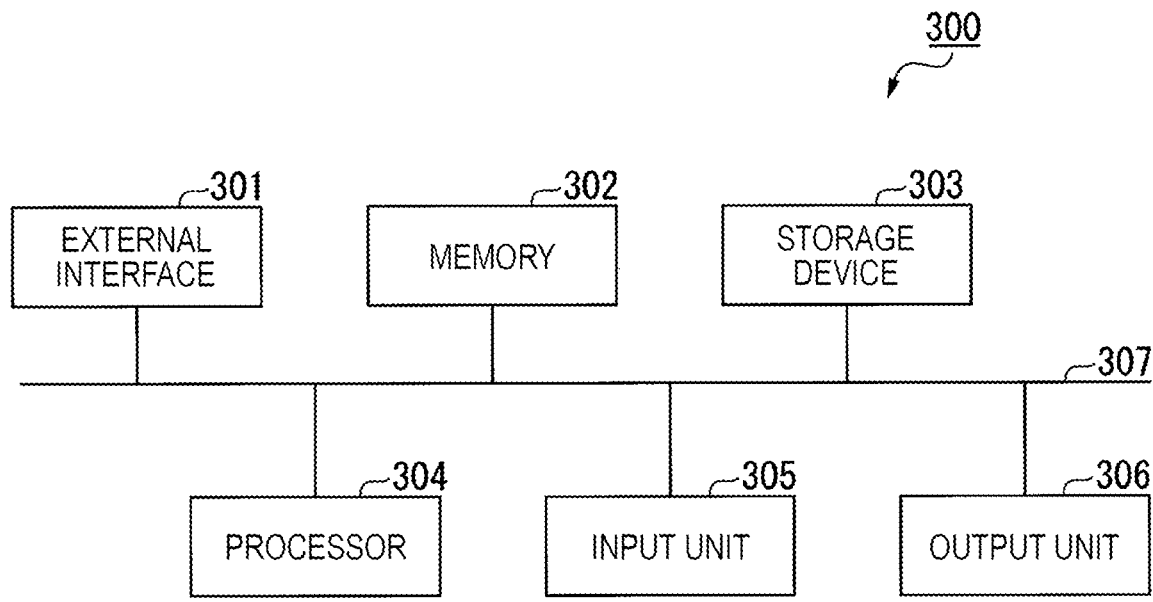
FIG. 3 is a hardware block diagram of a terminal device according to an embodiment.

FIG. 3 is a block diagram showing a hardware configuration of the terminal device 300 according to an embodiment. The terminal device 300 includes an external interface 301, a memory 302, a storage device 303, a processor 304, an input unit 305, and an output unit 306. The units of the terminal device 300 are connected to each other through a system bus 307.

The external interface 301 is a communication interface. The external interface 301 communicates with another device (for example, the image forming device 100 or the maintenance support device 400) through the network 500 with a particular protocol.

The memory 302 temporarily stores data used by each unit of the terminal device 300. The memory 302 is, for example, a RAM. The memory 302 stores data required for operation of the terminal device 300.

The storage device 303 is a storage device such as an HDD or an SSD. The storage device 303 stores data required for operation of the terminal device 300. For example, the storage device 303 stores a communication program for communicating with the maintenance support device 400.

The processor 304 controls the units of the terminal device 300. The processor 304 executes a process by loading a software program stored in the storage device 303 into the memory 302 and executing the loaded software program.

The input unit 305 is an input device, such as a keyboard, a pointing device (e.g., a mouse, a tablet, or the like), a button, or a touch panel. The input unit 305 is operated by a user to input an instruction to the terminal device 300. The input unit 305 may be an interface for connecting the input device to the terminal device 300. In such a case, in response to the user's input, the input unit 305 outputs an input signal to the terminal device 300.

The output unit 306 outputs data for the user of the terminal device 300 through an output device connected to the terminal device 300. The output device is a device that displays, for example, an image or letters on a screen. For example, the output device is an image display device, such as an LCD, an organic EL display, an electrophoresis display, or a cathode ray tube (CRT) display. In addition, the output device may be a device that prints an image or letters on a sheet. For example, the output device is an ink jet printer, a laser printer, or the like. In addition, the output device may be a device that converts letters into a sound and outputs the sound. In such a case, the output device is a sound synthesis device or a sound output device (e.g., a speaker). The output device may be a light emitting device such as a light emitting diode (LED). In some examples, he output unit 306 may send determination results to another information processing device via a communication device provided in the terminal device 300. In some examples, the output unit 306 may be integrated with the terminal device 300.

Figure 4:
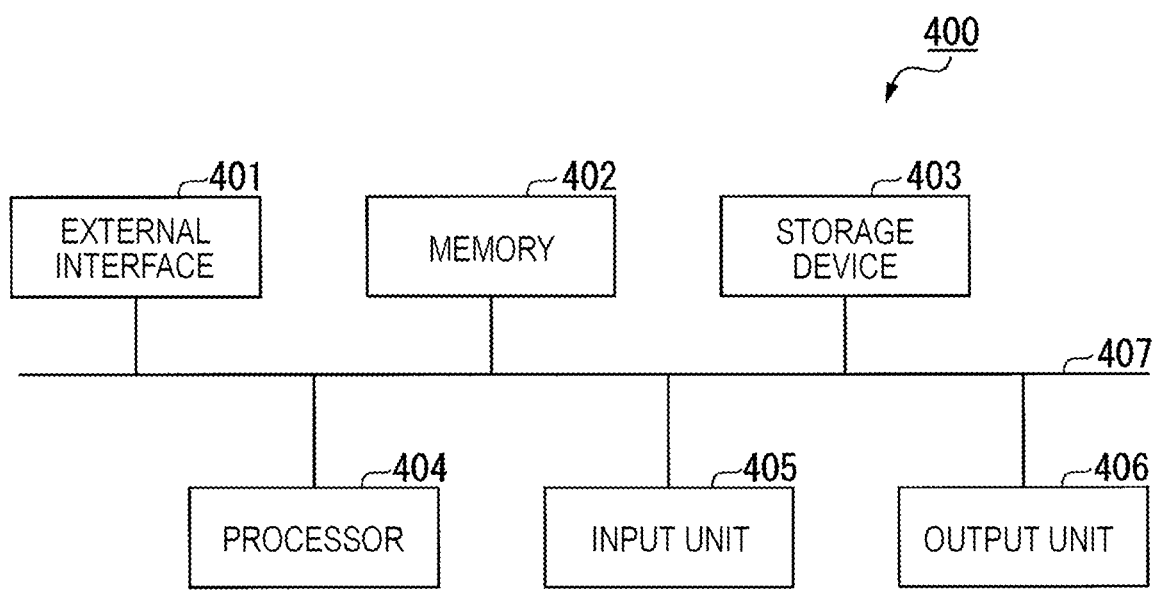
FIG. 4 is a hardware block diagram of a maintenance support device according to an embodiment.

FIG. 4 is a block diagram showing a hardware configuration of the maintenance support device 400 according to an embodiment. The maintenance support device 400 includes an external interface 401, a memory 402, a storage device 403, a processor 404, an input unit 405, and an output unit 406. The units of the maintenance support device 400 are connected to each other through a system bus 407.

The external interface 401 is a communication interface configured to communicate with another device (for example, the image forming device 100 or the terminal device 300) through the network 500 with a particular protocol.

The memory 402 temporarily stores data used by each unit of the maintenance support device 400. The memory 402 is, for example, a RAM. The memory 402 stores data required for operation of the maintenance support device 400.

The storage device 403 is a storage device such as an HDD or an SSD. The storage device 403 stores data required for operation of the maintenance support device 400. The storage device 403 stores, for example, work result information, work information, and data of a manual.

The work result information indicates a failure occurred in the image forming device 100 and the maintenance work that has been performed to deal with the failure. The work result information is generated for each failure occurring in the image forming device 100 and reported from the user of the image forming device 100. The work result information indicates whether the failure of the image forming device 100 is solved by the maintenance work.

The work information is a collection of the work result information generated for various kinds of failures in the image forming device 100.

The manual is stored as digital data and can be referred to by a maintenance worker. The manual suggests or lists the maintenance work to be performed on the image forming device 100 for solving a failure. The contents of the manual are classified into discrete items by chapter numbers, section numbers, or the like. The specific contents of the manual may vary depending on the type of the image forming device 100. For example, the manual may be a user manual created primarily for an end user of the image forming device 100 or a service manual created primarily for a maintenance worker or a combination of these manual types.

The processor 404 controls the units of the maintenance support device 400. The processor 404 executes a process by loading a software program stored in the storage device 403 into the memory 402 and executing the loaded software program.

The input unit 405 is an input device, such as a keyboard, a pointing device (e.g., a mouse, a tablet, or the like), a button, or a touch panel. The input unit 405 is operated by a user to input an instruction to the maintenance support device 400. The input unit 405 may be an interface for connecting the input device(s) to the maintenance support device 400. In such a case, in response to the user's input, the input unit 405 outputs an input signal to the maintenance support device 400.

The output unit 406 outputs data for the user of the maintenance support device 400 through an output device connected to the maintenance support device 400. The output device is a device that displays, for example, an image or text on a screen. For example, the output device is an image display device, such as an LCD, an organic EL display, an electrophoresis display, or a CRT display. In addition, in some embodiments, the output device may be a device that prints an image or text on a sheet. For example, the output device can be an ink jet printer, a laser printer, or the like. In addition, the output device may be a device that converts text into sound (speech) and outputs the sound. In such a case, the output device can be a sound synthesis device or a sound output device (e.g., speaker). The output device also may be a light emitting device such as an LED.

FIG. 5 is a diagram of a display screen showing work result information 600 about maintenance work in which an explanation is given to a user. The work result information 600 shown in FIG. 5 is output via, for example, the output unit 306 of the terminal device 300. The work result information 600 depicted in FIG. 5 corresponds to a specific example of a maintenance person resolving a reported error or failure of the image forming device 100 by providing a verbal explanation/solution to a user. The work result information 600 corresponds to a written report or record of the various details of the error resolution in this manner. In some instances, an error/failure can be corrected just by having a maintenance person verbally explain a method for resolving/avoiding the error solution to the user. For example, when a failure occurs due to an operational error by a user, such as the input of an incorrect setting/selection by the user, then maintenance person may simply verbally explain the correct setting/selection for the user.

The region 601 indicates a device ID identifying the image forming device 100. The device ID is used for a service provider of the image forming device 100, such as a call center worker, to uniquely identify the image forming device 100. For example, when the call center worker receives a call from a user, the call center worker inputs the device ID into the system. The device ID may be any information as long as it can identify the image forming device 100. The depicted region 601 indicates "MFP05" as the device ID, which means that the work result information 600 indicates results of maintenance work performed for the device, "MFP05".

The region 602 indicates a work report number assigned to the work result information. The work report number is used as index value or identifier that can be used for a call center worker or a maintenance worker to access particular work result information via the maintenance support device 400. The work report number can be set by the processor 404 of the maintenance support device 400 when the work result information is generated. In general, in this context, the work report number may be any information as long as the information can be used to identify the work result information. The depicted region 602 indicates "REP-0003" as an example of such a work report number.

The region 603 indicates the name of a call center worker who has received a call from a user of the image forming device 100. The call center worker inputs his or her name when receiving the call. The region 603 indicates "Tanaka" as an example of such a name of the call center worker who received a call.

The region 604 indicates the date of the call received from the user of the image forming device 100. The date of the call can be input by the call center worker when the member receives the call. The depicted region 604 indicates "2019/3/6" as an example of such a date of a call, which indicates that the call center worker received the call on Mar. 6, 2019.

The region 605 indicates a particular failure that has occurred in the image forming device 100. The failure is specified by the call center worker when the call center worker receives a call from a user indicating a failure type or particular symptom of a failure type. The depicted region 605 indicates a "defective image" as an example of the failure. The failure may be selected via a pull-down menu, for example. Another example of such a failure is "display of error" (e.g., an error message), "no power" or a "warning".

The region 606 indicates an error code displayed on the display 110 of the image forming device 100 when the failure has occurred. The error code is input by the call center worker when the call center worker receives the call. The error code is reported from the user of the image forming device 100 to the call center worker over the phone. The depicted region 606 indicates "ERR0123" as an example of such an error code. This example indicates that the error code, "ERR0123" has been displayed on the image forming device 100. The maintenance support device 400 may, in some examples, acquire such an error code from the image forming device 100 through the network 500. When the maintenance support device 400 acquires two or more error codes from the image forming device 100, an appropriate error code among acquired error codes may be chosen and input by the call center worker. In such a case, the call center worker may choose one of the error codes by pressing a displayed button. The error code varies depending on the type of the image forming device 100.

The region 607 indicates particulars of a user explanation of the failure/error that has occurred. The user explanation in region 607 is based on the information provided by the user of the image forming device 100. The user explanation can be input by the call center worker when the call center worker receives the call. The information included in the user explanation (region 607) can be provided by the user of the image forming device 100 over the phone. The depicted region 607 indicates "changes in color at the time of color printing" as an example of such a user provided explanation of an error. This example indicates that a failure related to "changes in color at the time of color printing" has occurred in the image forming device 100.

The region 608 indicates the name of a maintenance worker who is responsible for maintenance work on the image forming device 100. The name of the maintenance worker may be manually input when he or she performs the maintenance work or automatically by, for example, using login information input by the maintenance worker via the terminal device 300. The depicted region 608 indicates "Suzuki" as an example of the name of a maintenance worker. This example indicates that maintenance work corresponding to the work result information 600 has been performed by "Suzuki".

The region 609 indicates the date of work when the maintenance work has been performed on the image forming device 100. The date of work may be input by the maintenance worker who performed the maintenance work or may be automatically input on the basis of the current date acquired by the terminal device 300. The depicted region 609 indicates "2019/3/7" as an example of such a date of work. This example indicates that the maintenance work indicated by the work result information 600 was performed on Mar. 7, 2019.

The region 610 indicates whether the failure of the image forming device 100 has been solved by the maintenance work. Such information is input by the maintenance worker who performed the maintenance work. For example, the depicted region 610 is represented by a binary value (yes/no) such by use of as a checkbox. For example, when the failure of the image forming device 100 has been solved by the maintenance work, the maintenance worker checks the checkbox. For example, when the failure of the image forming device 100 has not been solved by the maintenance work, the maintenance worker does not check the checkbox. According to the depicted region 610 (the checkbox "solved" is checked), the failure of the image forming device 100 has been solved by the maintenance work.

The regions 611 to 614 are regions indicating the details of the maintenance work that has been performed to solve the failure of the image forming device 100. The region 611 indicates the solution type that was performed to solve or try to solve the reported failure of the image forming device 100. In this context, the "solution" field (region 611) indicates a general explanation of the solution type of the maintenance work that has been performed. The "solution" field is filled by the maintenance worker who has performed the maintenance work. The depicted region 611 indicates "user explanation" as an example of a solution type that has been performed. This depicted example indicates that a "user explanation" has been performed as the maintenance work. In this context, "user explanation" means that the maintenance worker has attempted to resolve the failure by providing instructions verbally to the user on how to solve the failure of the image forming device 100. As in the depicted example of FIG. 5, the solution type may be input via selection from a pull-down menu. Alternatively, the solution type may be input as text. As the solution types, for example, "part replacement", "setting", "adjustment•or cleaning", or "user environment maintenance" may be selectable. The "part replacement" solution type indicates maintenance work required replacing a part of the image forming device 100. The "setting" solution type indicates maintenance work required changing a setting of the image forming device 100. The "adjustment•or cleaning" solution type indicates maintenance work required physically adjusting equipment inside the image forming device 100 or cleaning the inside the image forming device 100. The "user environment maintenance" solution type indicates the performed maintenance work related to changes or adjustments of a user environment in which the image forming device 100 is used, such as a network environment.

The region 612 indicates a large category (broad category) of an information source that has been referred to by the maintenance worker to perform the maintenance work on the image forming device 100. The large category is input by the maintenance worker. The large category may be selected via a pull-down menu. For example, the large category may be "manual", "service materials" or "service social networking service (SNS)," which is provided for maintenance workers. In this context, "service materials" refer to various materials that disclose possible solutions to solve failures of the image forming device 100, such as notices or memos posted to an internal digital bulletin board provided for maintenance workers. In this context, the "service SNS" is a web service used by maintenance workers to exchange information. The service SNS is used to share information such as a repair solution of the image forming device 100.

The region 613 indicates a middle category (sub-category of a broad category) of the information source indicated by the large category. For example, when the large category is a "manual", the middle category (sub-category) is a "user manual" or a "service manual". The middle category is input by the maintenance worker. The middle category may be selected via a pull-down menu.

The region 614 indicates a small category (sub-category of the middle category) indicating specifically which portion of the information source specified by the broader categories was referred to by the maintenance person for performing the maintenance work. For example, when the middle category indicates a "user manual" or a "service manual," the small category may be, for example, a particular chapter number or section number. The small category is input by the maintenance worker. The small category may be selected via a pull-down menu. The small category may not always be available for selection/input depending on the particular selected middle category.

According to the regions 612 to 614, in the first row of solution details, "manual" is input as the large category, "user manual" is input as the middle category, and "10-37" is input as the small category. This example indicates that the maintenance worker has provided a solution to the user based at least in part on the explanation found in chapter 10, section 37 of the user manual.

According to the regions 612 to 614, in the second row of the solution details, "manual" is input as the large category, "service manual" is input as the middle category, and "36-29" is input as the small category. Thus, this example indicates that the maintenance worker has provided a solution based at least in part on the information explained by chapter 36, section 29 of the service manual.

According to the regions 612 to 614, in the third row of the solution details, "service materials" is input as the large category, and "SV0342" is input as the middle category. Thus, this example indicates that the maintenance worker has provided a solution based at least in part on the information explained in to the particular one of the various service materials labeled/titled/referenced as "SV0342".

The region 615 indicates images of reference buttons for retrieving the information sources as specified by the large category, the middle category, and the small category. In response to a selection of one of the reference buttons, a request is issued for retrieving the corresponding information source from the maintenance support device 400. For example, when a maintenance worker is checking the work result information 600 via the screen shown in FIG. 5 using the terminal device 300, when the worker makes a selection of the reference image in the first row of the solution details, the processor 304 of the terminal device 300 issues a request for data of a user manual specified by "manual" as the large category, "user manual" as the middle category, and "10-37" as the small category, to the maintenance support device 400. Upon receipt of the corresponding manual data from the maintenance support device 400, the processor 304 controls the output unit 306 to output the user manual information. The maintenance worker can perform maintenance work on the basis of the user manual which has been output via the output unit 306. In general, any information may be freely input into the regions 611 to 614 as solution details for aiding future maintenance work concerning similar failures.

Figure 6:
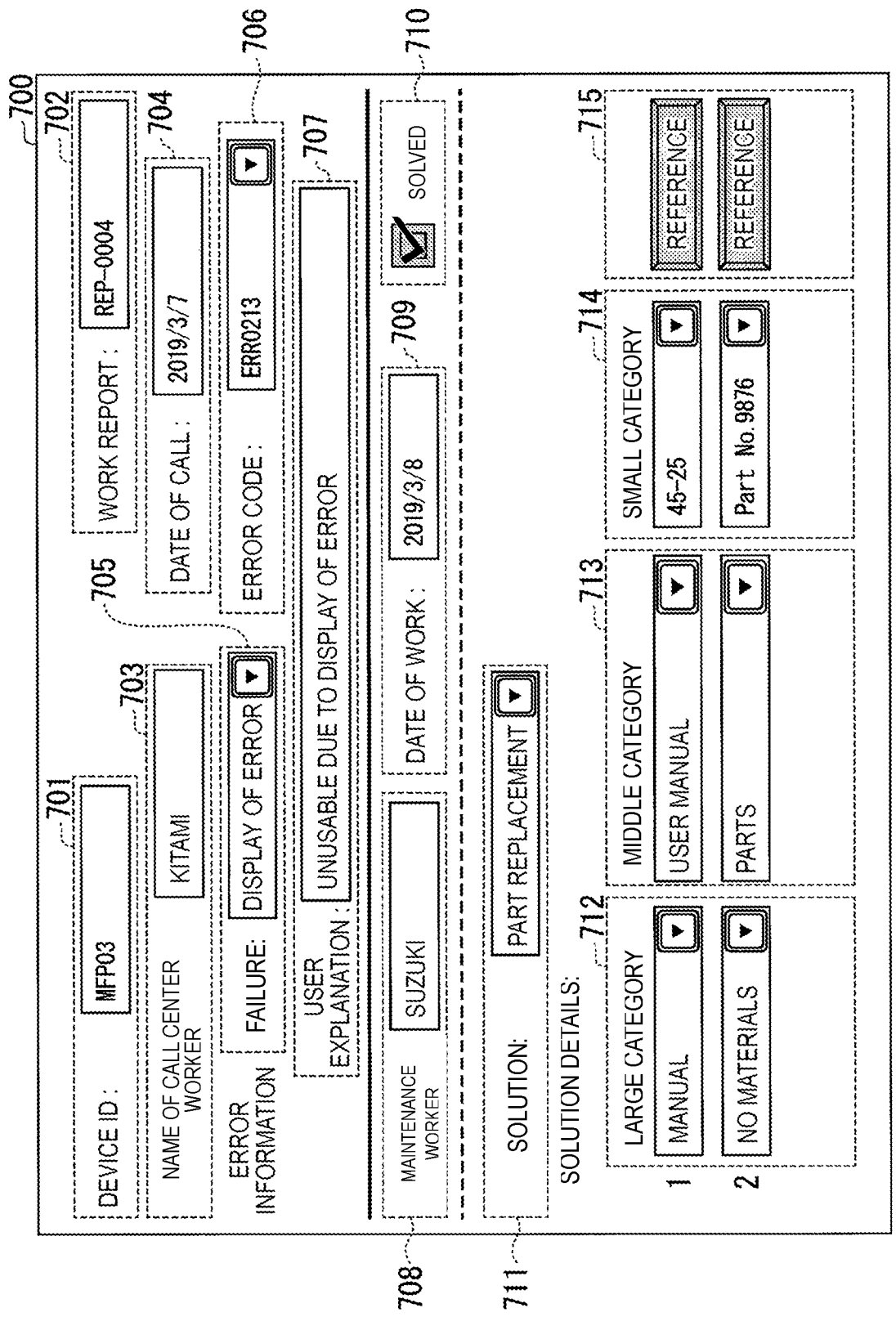

FIG. 6 is a diagram of a display screen showing work result information 700 about maintenance work in which part replacement has been performed. The work result information 700 shown in FIG. 6 is output via, for example, the output unit 306 of the terminal device 300. The work result information 700 indicates an example where a maintenance worker has performed a part replacement on the image forming device 100. The work result information 700 includes regions 701-715. The regions 701-715 are used to indicate the same information as the regions 601-615 of the work result information 600.

The region 701 indicates a device ID. The depicted region 701 indicates "MFP03" as an example of such a device ID, which means that the work result information 700 corresponds to results of maintenance work that has been performed for the device, "MFP03".

The region 702 indicates a work report number. The depicted region 702 indicates "REP-0004" as an example of such a work report number. This example indicates that the work result information 600 is identified by the work report number, "REP-0004".

The region 703 indicates the name of a call center worker who has received a call from a user of the image forming apparatus 100. The depicted region 703 indicates "Kitami" as an example of such a name of the call center worker.

The region 704 indicates the date of the call. The depicted region 704 indicates "2019/3/7" as an example of such a date of the call. This example indicates that the call has been received on Mar. 7, 2019.

The region 705 indicates a failure that has occurred in the image forming device 100. The depicted region 705 indicates "display of error" as an example of such a failure. This example shows that a failure related to the "display of error" has occurred in the image forming device 100.

The region 706 indicates an error code displayed on the display 110 of the image forming device 100 when the failure has occurred. The depicted region 706 indicates "ERR0213" as an example of such an error code. This example shows that the error code "ERR0213" has been displayed on the image forming device 100.

The region 707 indicates the user explanation provided by the user of the image forming device 100 in explaining the error/failure/problem. The depicted region 707 indicates "unusable due to display of error" as an example of such a user explanation. This example indicates that the image forming device 100 has become "unusable due to display of error".

The region 708 indicates the name of a maintenance person who has performed maintenance work on the image forming device 100. The depicted region 708 indicates "Suzuki" as an example of such a name of a maintenance person. This example indicates that maintenance work indicated by the work result information 700 has been performed by "Suzuki".

The region 709 indicates the date of work when the maintenance work has been performed on the image forming device 100. The depicted region 709 indicates "2019/3/8" as an example of such a date of work. This example indicates that the maintenance work indicated by the work result information 700 has been performed on Mar. 8, 2019.

The region 710 indicates whether the failure of the image forming device 100 has been solved by the maintenance work. In the depicted region 710, the checkbox is checked, which means that the failure of the image forming device 100 has been solved by the maintenance work.

The regions 711 to 714 are regions indicating the details of the maintenance work that has been performed to solve the failure of the image forming device 100. The region 711 indicates a solution type that has been performed. The region 711 indicates "part replacement" as an example of such a solution type. This example indicates that "part replacement" has been performed as the maintenance work.

The region 712 indicates the large category of an information source that has been referred to by the maintenance worker. The region 713 indicates a middle category of such an information source. The region 714 indicates a small category of such an information source.

According to depicted the regions 712 to 714, in the first row of the solution details, "manual" is input as the large category, "user manual" is input as the middle category, and "45-25" is input as the small category. This example indicates that the maintenance worker has referred to chapter 45, section 25 of the user manual for the performing the part replacement.

According to the depicted regions 712 to 714, in the second row of the solution details, "no materials" is input as the large category, "parts" is input as the middle category, and "Part No. 9876" is input as the small category. The information input in the small category indicates a part number. This example indicates that the maintenance worker has replaced a part of the image forming device 100 which is specified as Part No. 9876.

The region 715 has images of reference buttons for retrieving information sources as specified by the large category, the middle category, and/or the small category. In response to a selection of a reference button, a request is issued for retrieving the corresponding information source from the maintenance support device 400. For example, a maintenance worker reviewing the work result information 700 via the screen shown in FIG. 6 using the terminal device 300, in response to a selection of the reference image (button) in the first row of the solution details, the processor 304 of the terminal device 300 issues a request for data of a user manual specified by "manual" as the large category, "user manual" as the middle category, and "45-25" as the small category, to the maintenance support device 400. Upon receipt of the corresponding manual data from the maintenance support device 400, the processor 304 controls the output unit 406 to output the received user manual. The maintenance worker can perform maintenance work on the basis of the user manual information which has been output via the output unit 306. In general, any information may be input into the regions 711 to 714 for explaining the provided solution(s).

The work result information shown in FIGS. 5 and 6 is not limited to the above-described example. For example, the work result information may indicate a work time that has been scheduled for completing maintenance work. In addition, the work result information may indicate costs required for part replacement and/or the service fees for the replacement of the part. Furthermore, the work result information may include specific work details that have been input by a maintenance worker via the input unit 305 in free format (e.g., a "notes" field or the like) as additional information related to the work result. The processor 304 records the additional information as a part of the work result information.

FIG. 7 is a diagram showing a work information table according to an embodiment. The data of the work information table is stored in the storage device 403. The work information table includes a plurality of records each storing the work result information, as described above. Thus, each record corresponds to the work result information including the work report number, the date of work, the name of the maintenance worker, the device ID, the failure, the error code, a flag indicating whether the failure has been solved, the solution type, the large category, the middle category, and the small category. Additionally, each record includes a device type, which is an identifier for identifying the device type of the image forming device 100 and this can be associated with a device ID. Thus, when new work result information is generated, the processor 404 stores it in a new record of the work information table, and identifies and stores the device type corresponding to the device ID.

Figure 8:
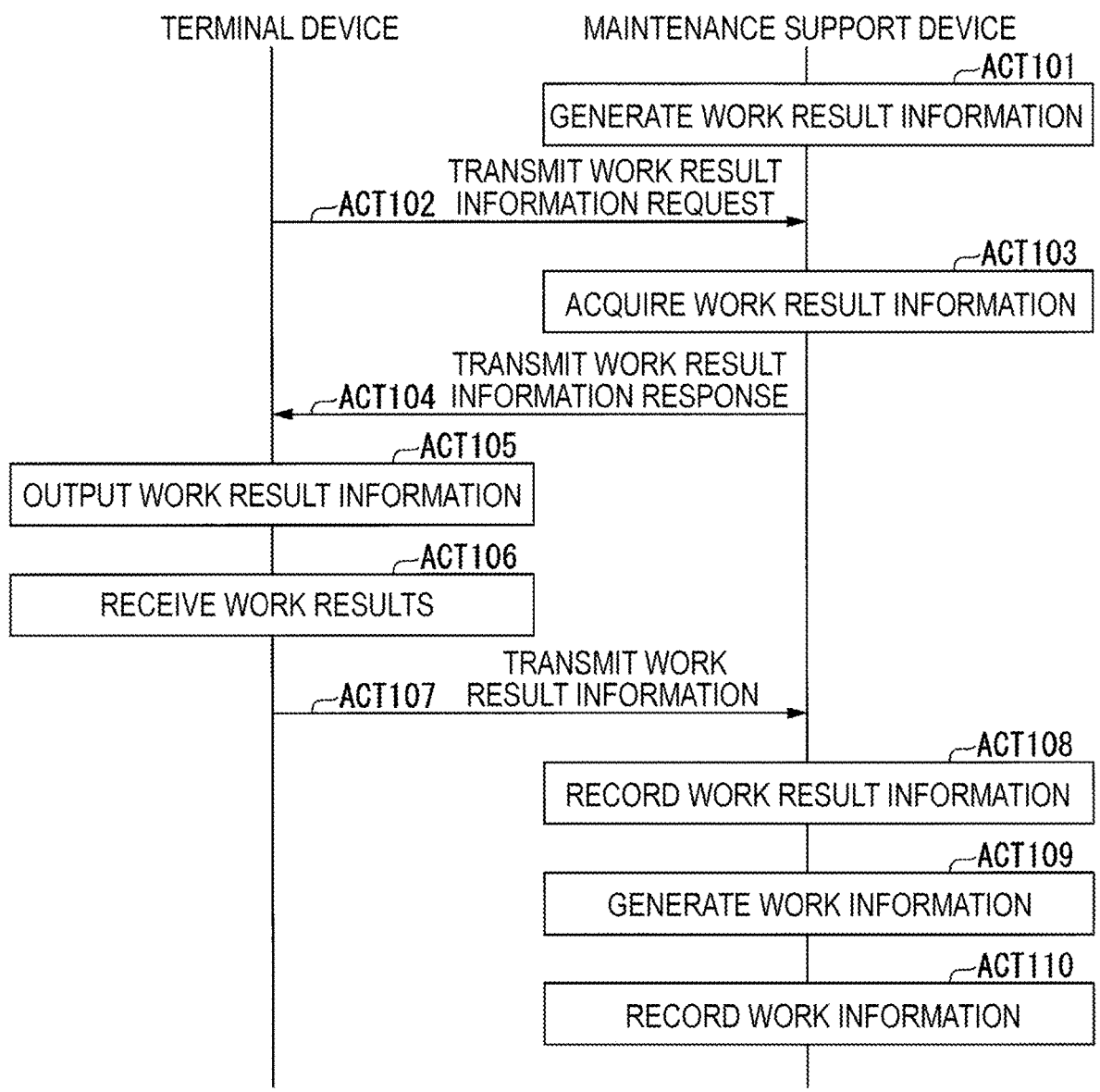
FIG. 8 is a flowchart of a process of generating work information according to an embodiment.

FIG. 8 is a flowchart of a process of generating the work information according to an embodiment. In this example, the output unit 306 of the terminal device 300 is a display device such as a display screen.

Initially, when a user of the image forming device 100 makes a call to a call center, a call center worker who responds the call operates his or her own terminal device to access the maintenance support device 400 and generate work result information (ACT101). Specifically, the processor 404 generates the work result information including predetermined information in response to an instruction input by the call center worker via his or her terminal device. The predetermined information includes a device ID of the image forming device 100 being used by the user, a work report number, the name of the call center worker, the date of the call, a failure or an error reported by the user, an error code displayed by the user's image forming device 100 (if applicable), and a user explanation of the problem/failure provided by the user. The predetermined information or portions thereof may be automatically generated by the processor 404 or may be manually input by the call center worker via the terminal device. The processor 404 records the generated work result information in the storage device 403.

Once the maintenance work has been assigned to a maintenance worker, the maintenance worker operates his or her terminal device 300 to acquire the generated work result information. Specifically, upon receipt of an input operation by the maintenance worker via the input device 305 of the terminal device 300, the processor 304 of the terminal device 300 controls the external interface 301 to transmit a work result information request to the maintenance support device 400 (ACT102). The work result information request includes the work report number of the work result information, which corresponds to the maintenance work that has been assigned to the maintenance worker.

Upon receipt of the work result information request, the processor 404 acquires the work result information (ACT103). Specifically, the processor 404 acquires the work report number included in the work result information request, and then acquires the work result information associated with the work report number from the storage device 403. The processor 404 controls the external interface 401 to transmit a work result information response including the acquired work result information to the terminal device 300 (ACT104).

Upon receipt of the work result information response, the processor 304 controls the output unit 306 to output the work result information (ACT105). Specifically, the processor 304 records the name of the maintenance worker and the current date of work in the work result information. For example, the processor 304 may retrieve the name of the maintenance worker and the current date of work from system information stored in the terminal device 300. The name of the maintenance information may be input by the maintenance worker through the input unit 305. The processor 304 controls the output unit 306 to output the work result information including the name of the maintenance worker and the current date of work.

After the maintenance work has been done, the processor 304 accepts inputs of work results by the maintenance worker via the input unit 305 (ACT106). Specifically, the processor 304 receives inputs of information indicating whether the failure is solved, its solution, and the large, middle, and small categories of the solution, through the input unit 305. The processor 304 records the input values in the work result information. The processor 304 controls the external interface 301 to transmit the work result information to the maintenance support device 400 (ACT107).

The processor 404 records the received work result information in the storage device 403 (ACT108). Specifically, the processor 404 updates the existing work result information with the received work result information. The processor 404 generates work information on the basis of the updated work result information (ACT109). If the work information table as shown in FIG. 7 has been generated, the processor 404 adds a new record to store the received work result information. Specifically, the processor 404 acquires the date of work, the name of the maintenance worker, the device ID, the failure, the error code, whether the failure has been solved, the solution, the large category, the middle category, and the small category, from the received work result information. Next, the processor 404 specifies a device type associated with the device ID based on, for example, information stored in the storage device 403. The processor 404 generates the work information table or a new record for the table indicating the date of work, the name of the maintenance worker, the device ID, the device type, the failure, the error code, whether the failure has been solved, the solution, the large category, the middle category, and the small category. The processor 404 records the generated work information table or record in the storage device 403 (ACT110).

Figure 9:
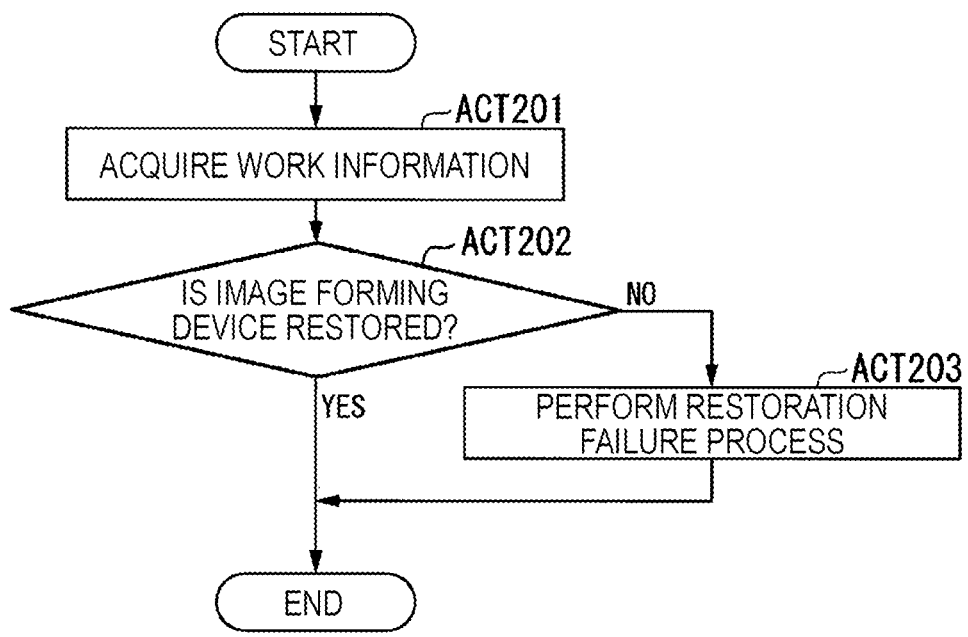
FIG. 9 is a flowchart of a process of tracking whether a failure that has occurred in an image forming device is solved.

FIG. 9 is a flowchart of a process of tracking whether the reported failure or error has been actually solved by the maintenance work. This process is performed to identify work result information that shows a solution that has actually solved a failure. The process in FIG. 9 can be executed on a regular basis, e.g., once a day, once a week, or the like.

Initially, the processor 404 of the maintenance support device 400 acquires work result information stored in the work information table (ACT201). Specifically, the processor 404 acquires the work result information that has been stored through the process described with reference to FIG. 8.

The processor 404 determines whether a reported failure has been solved through a maintenance work indicated in the acquired work information (ACT202). Specifically, the processor 404 determines that the failure has been solved when there is no other work result information, which indicates the same failure (e.g., a matching failure and/or the same error code) on the same image forming apparatus (e.g., the same device ID) within a predetermined period after the date of work indicated by the work information acquired in ACT201. For example, the predetermined period is seven or fourteen days. The predetermined period may be set independently for each failure or error code. For example, when the failure is a "defective image", the predetermined period may be fourteen days after the date of work indicated by the work information acquired in ACT201. For example, when the failure is "display of error", the predetermined period may be seven days after the date of work indicated by the work information acquired in ACT201.

When it is determined that the failure of the image forming device 100 has been solved (ACT202: YES), the processor 404 terminates the process. When it is determined that the failure of the image forming device 100 has not been solved (ACT202: NO), the processor 404 performs a restoration failure process (ACT203). Specifically, in the restoration failure process, the processor 404 sets a negative value or a negative flag indicating that the failure of the image forming device 100 has not been solved to the work result information acquired in ACT202. The processor 404 records the updated work result information in the storage device 403.

In addition, the processor 404 may control the output unit 406 to output a screen to input a reason why the failure has not been solved, e.g., "insufficient solution", "additional solution performed", or the like. This screen may be displayed on the output unit 406 of the maintenance support device 400 or on the output device 306 of the terminal device 300 operated by the maintenance worker who has performed the solution. The processor 404 records the input information in association with the work result information in the storage device 403. The processor 404 then controls the external interface 401 to transmit a request for reviewing the input information to a terminal used by a supervisor of the maintenance worker.

An example of the process will be described using the work information table shown in FIG. 7. Here, the predetermined period is seven days after the date of work.

Initially, the processor 404 acquires work result information having the work report number, "REP-0004" (hereinafter called the target work result information). The processor 404 then determines whether the failure of the image forming device 100 has been solved through the maintenance work related to the target work result information. Specifically, the processor 404 searches for other work result information (e.g., other records in the work information table shown in FIG. 7) indicating the same device ID, the same error code, and the date of work within seven days after the date of work of the target work result information. Here, The processor 404 finds the work information indicating "REP-0005." Therefore, the processor 404 determines that the failure of the image forming device 100 has not been solved through the maintenance work associated with the target work result information. The processor 404 performs the restoration failure process on the target work information having the work report number, "REP-0004".

Figure 10:
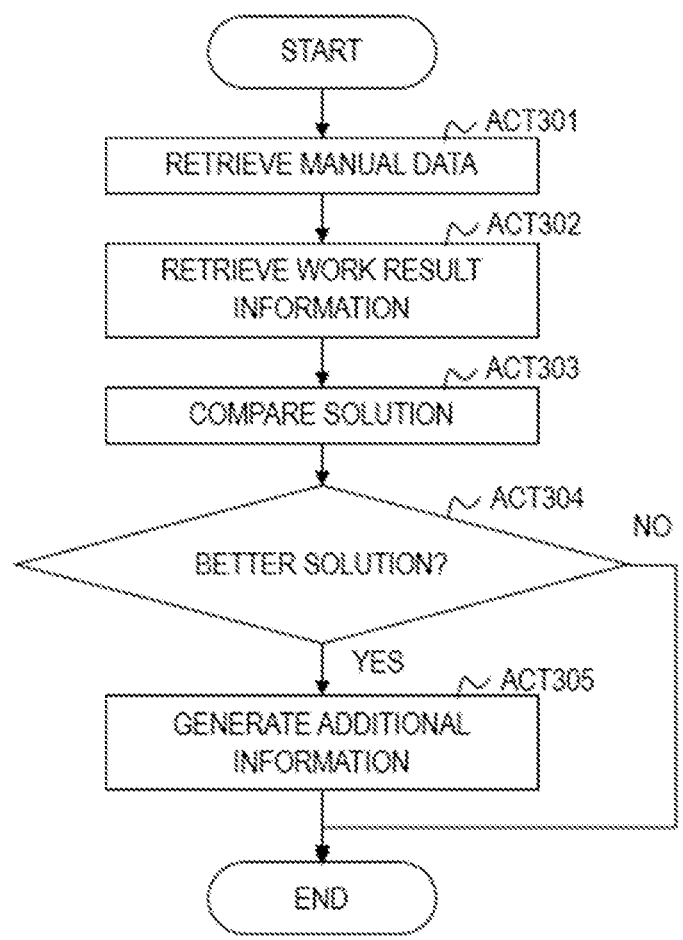
FIG. 10 is a flowchart of a process of generating information to be added to an existing manual based on stored work result information.

FIG. 10 is a flowchart of a process of generating information to be added to an existing manual based on stored work result information. The process in FIG. 10 is executed on a regular basis, e.g., once a day, once a week, or the like, for each type of image forming device.

Initially, the processor 404 of the maintenance support device 400 retrieves from the storage device 403 data of a maintenance manual for an image forming device 100 that is of a certain device type (ACT301). The manual data is provided by the manufacturer of the image forming device 100 and shows solutions to various failures that may occur in the image forming device 100. For example, each solution is provided for each failure or error code and shows a maintenance work to be performed, an estimate of time required for the maintenance work, and an estimate of costs of the maintenance work.

Next, the processor 404 retrieves from the storage device 403 work result information associated with the device type and indicating that the failure have been solved (ACT302). The processor 404 then compares the solution indicated by the retrieved work result information with the one indicated by the manual data to solve the same failure (ACT303), and determines whether the former is better than the latter (ACT304). To determine a better solution, the processor 404 may use the following policies:

1. The solution including more description is better;
2. The solution that can be done within less time is better; and/or
3. The solution that can be done at less cost is better.

The policies are not limited to the above-described examples. For example, a solution provided by a specific maintenance worker whose skill level is greater than some predetermined level may be considered to be better than other solutions. Additionally, the processor 404 can perform natural language analysis on the descriptions of the retrieved work result information and the manual data and determines a better description accordingly.

When determining that the solution indicated by the retrieved work result information is better than the one indicated by the manual data (ACT304: YES), the processor 404 generates additional information that indicates the solution, the large category, the middle category, and the small category shown in the work result information (ACT305), and stores in the storage device 304 the additional information in association with the corresponding solution of the manual data. For example, the additional information is embedded in the manual data and is shown together with the original solution of the manual data when referred to by a maintenance worker.

In ACT303, if there has been already additional information generated, the processor 404 may compare the solution indicated in the work result information retrieved in ACT302 and the solution indicated in the existing additional information, and determine which solution is better. In such a case, the processor 404 generates new additional information when the solution indicated in the retrieved work result information is better. Alternatively, the processor 404 may generate new additional information regardless of whether the additional information has been generated. In such a case, the processor 404 generates new additional information every time the processor 404 determines that the solution indicated in the acquired work result information is better than the one indicated in the manual data.

Additionally, the processor 404 may control the output unit 406 to output the additional information so that an operator can review the solution and merge it into the manual data.

In the maintenance system 1 configured in the above-described manner, the maintenance support device 400 records support information, such as work result information, indicating the details of maintenance work performed by a maintenance worker in the storage device 403. The support information indicates whether a failure that occurred in an image forming device 100 used by a user has been solved. The support information can be referred to by other maintenance workers. In the maintenance system 1, such support information recorded in the storage device 403 is transmitted to the terminal device 300 in accordance with a request transmitted by the terminal device 300 used by a maintenance worker. By referring to the support information, the maintenance worker can more appropriately perform his or her maintenance work on the image forming device 100.

In addition, when the same failure has re-occurred within some predetermined period after the maintenance work was performed, the maintenance support device 400 determines that the failure of the image forming device has not been fully solved and updates the corresponding support information. Thus, maintenance workers can access useful support information indicating which maintenance work has been done that has successfully and lastingly solved a failure.

Furthermore, the maintenance support device 400 can generate information that can be added to existing manual data. The information can be generated based on the support information indicating that a better solution than the existing manual solution has actually been provided by a maintenance worker. Thus, other maintenance workers can learn of such a better solution when they access the existing manual.

Modification Example

In the above-described embodiments, the processor 404 determines a manual section satisfying a predetermined condition as a change target, but is not limited thereto. For example, the processor 404 may accept an instruction from an operator through the input unit 405 to change or update the manual.

The above-described maintenance system 1 may be configured to transmit the generated additional information to a terminal used by a user of the image forming device 100. For example, when the generated additional information is stored in the storage device 403, the processor 404 may control the external interface 401 to transmit the generated additional information to a destination address registered in advance. Any notification method may be used. For example, a maintenance worker may explain the contents of the generated additional information to the user of the image forming device 100 by telephone or in person.

The maintenance support device 400 may be implemented by a plurality of information processing devices communicatively connected to each other through a network. In such a case, the components of the maintenance support device 400 may be dispersed in the plurality of information processing devices. For example, the storage device 403 and the processor 404 may be installed in different ones of the information processing devices.

The processes described in the above-described embodiments may be performed by a processor or a dedicated hardware such as an LSI.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A maintenance support device, comprising:
   a memory that stores data of a maintenance manual that describes a first maintenance work to be performed to resolve a failure of an image processing apparatus; and
   a processor configured to:
   acquire, and store in the memory, work result information corresponding to a second maintenance work that has been performed to resolve the failure of the image processing apparatus, and
   generate additional information based on the acquired work result information and store in the memory the additional information in association with the data of the maintenance manual.

2. The maintenance support device according to claim 1, wherein the processor is further configured to:
   determine whether the second maintenance work is more time-efficient or cost-efficient than the first maintenance work, and
   upon determining that the second maintenance work is more time-efficient or cost-efficient, generate, and store in the memory, the additional information indicating that the second maintenance work is to be performed to resolve the failure of the image processing apparatus.

3. The maintenance support device according to claim 1, further comprising:
   a network interface, wherein
   the processor is further configured to, upon receipt of a request for the maintenance manual from a terminal device, control the network interface to transmit the data of the requested maintenance manual to the terminal device.

4. The maintenance support device according to claim 3, wherein the additional information is transmitted to the terminal device together with the data of the requested maintenance manual.

5. The maintenance support device according to claim 1, wherein
   the work result information indicates whether the failure of the image processing apparatus has been resolved, and
   the processor is further configured to monitor whether the failure has been resolved based on the work result information stored in the memory.

6. The maintenance support device according to claim 1, wherein the processor is further configured to, when the failure has not been resolved for a predetermined period, acquire information about a reason why the failure has not been resolved and store the information in the memory in association with the work result information.

7. A maintenance support method, comprising:
   storing, in a memory, data of a maintenance manual that describes a first maintenance work to be performed to resolve a failure of an image processing apparatus;
   acquiring, and storing in the memory, work result information corresponding to a second maintenance work that has been performed to resolve the failure of the image processing apparatus; and generating additional information based on the acquired work result information and storing in the memory the additional information in association with the data of the maintenance manual.

8. The maintenance support method according to claim 7, further comprising:

determining whether the second maintenance work is more time-efficient or cost-efficient than the first maintenance work, wherein when the second maintenance work is more time-efficient or cost-efficient, the additional information indicating that the second maintenance work is to be performed to resolve the failure of the image processing apparatus is generated and stored in the memory.

9. The maintenance support method according to claim 7, further comprising:

upon receipt of a request for the maintenance manual from a terminal device, transmitting the data of the requested maintenance manual to the terminal device.

10. The maintenance support method according to claim 9, wherein the additional information is transmitted to the terminal device together with the data of the requested maintenance manual.

11. The maintenance support method according to claim 7, wherein the work result information indicates whether the failure of the image processing apparatus has been resolved, and the method further comprises monitoring whether the failure has been resolved based on the work result information stored in the memory.

12. The maintenance support method according to claim 7, further comprising:

when the failure has not been resolved for a predetermined period, acquiring information about a reason why the failure has not been resolved and storing the information in the memory in association with the work result information.

13. A non-transitory computer readable medium storing a program causing a computer to execute a method comprising:

storing, in a memory, data of a maintenance manual that describes a first maintenance work to be performed to resolve a failure of an image processing apparatus;

acquiring, and storing in the memory, work result information corresponding to a second maintenance work that has been performed to resolve the failure of the image processing apparatus; and generating additional information based on the acquired work result information and storing in the memory the additional information in association with the data of the maintenance manual.

14. The non-transitory computer readable medium according to claim 13, wherein the method further comprises determining whether the second maintenance work is more time-efficient or cost-efficient than the first maintenance work, and when the second maintenance work is more time-efficient or cost-efficient, the additional information indicating that the second maintenance work is to be performed to resolve the failure of the image processing apparatus is generated and stored in the memory.

15. The non-transitory computer readable medium according to claim 13, wherein the method further comprises, upon receipt of a request for the maintenance manual from a terminal device, transmitting the data of the requested maintenance manual to the terminal device.

16. The non-transitory computer readable medium according to claim 15, wherein the additional information is transmitted to the terminal device together with the data of the requested maintenance manual.

17. The non-transitory computer readable medium according to claim 13, wherein the work result information indicates whether the failure of the image processing apparatus has been resolved, and the method further comprises monitoring whether the failure has been resolved based on the work result information stored in the memory.

18. The non-transitory computer readable medium according to claim 13, wherein the method further comprises, when the failure has not been resolved for a predetermined period, acquiring information about a reason why the failure has not been resolved and storing the information in the memory in association with the work result information.

* * * * *